United States Patent [19]

Killpatrick et al.

[11] Patent Number: 5,088,824
[45] Date of Patent: Feb. 18, 1992

[54] LASER BEAM CONTROL FOR A RING-LASER GYRO

[75] Inventors: Joseph Killpatrick, Minneapolis; Lloyd W. Priddy, Mahtomedi, both of Minn.

[73] Assignee: Honeywell Inc., Minneapolis, Minn.

[21] Appl. No.: 560,406

[22] Filed: Jul. 31, 1990

[51] Int. Cl.⁵ .................................... G01C 19/64
[52] U.S. Cl. ................................ 356/350; 372/94
[58] Field of Search ..................... 356/350; 372/94

[56] References Cited

U.S. PATENT DOCUMENTS

| | | |
|---|---|---|
| 3,642,373 | 2/1972 | Catherin . |
| 4,017,187 | 4/1977 | Schwartz . |
| 4,282,495 | 8/1981 | Ljung . |
| 4,284,964 | 8/1981 | Maier, Jr. . |
| 4,481,635 | 11/1984 | Broberg et al. . |
| 4,575,658 | 3/1986 | Kay . |
| 4,641,970 | 2/1987 | Gustafson et al. . |
| 4,795,258 | 1/1989 | Martin . |
| 4,813,774 | 3/1989 | Dorschner et al. . |
| 4,863,273 | 9/1989 | Nishiura . |

FOREIGN PATENT DOCUMENTS 0185385  6/1986  European Pat. Off. ............ 356/350

OTHER PUBLICATIONS

Morrison et al., A Missile Laser Gyro Rate Sensor, 8/76, pp. 1–5.
Morrison et al., The Slic-15 Laser Gyro IMU for Midcourse Missile Guidance, 1976, pp. 59–68.
K. Thomson, Integrated 3 Axis Laser Gyro, 1978, pp. 13–20.

*Primary Examiner*—Samuel A. Turner
*Attorney, Agent, or Firm*—Robert A. Pajak

[57] ABSTRACT

An RLG has a laser beam current control system which controls the current so as to produce a constant beam intensity, allowing the RLG to operate at a current level continuously matched to the operating conditions, thus extending the operating life of the RLG.

12 Claims, 3 Drawing Sheets

LASER BEAM CONTROL FOR A RING-LASER GYRO

CROSS REFERENCE TO RELATED APPLICATION

The disclosure of this application is related in subject matter to that of U.S. Application Ser. No. 07/557,281 filed 24 July, 1990, by Lloyd Wayne Priddy and Timothy Merrill Buck for "Improved Ring-Laser Gyro Beam Intensity Monitor" which is assigned to the assignee of this application. The disclosures of that application are incorporated herein by reference.

BACKGROUND OF THE INVENTION

1. Field of the Invention

The present invention generally relates to gas laser angular rate sensors, also known and referred to in the art as Ring-Laser Gyros (RLGs), and more particularly to an improved system for energizing an RLG in order to extend its operating life.

2. Description of the Prior Art

An integral part of a ring-laser gyro is the laser beam source or generator. One type of laser beam generator comprises electrodes and a discharge cavity in combination with a plurality of mirrors which define a closed path. The path is usually triangular but other paths such as rectangular can be used.

Present day ring-laser gyros employ a gas discharge cavity filled with a gas which is excited by an electric current passing between the electrodes ionizing the gas and creating a plasma. As is well understood by those skilled in the art, the ionized gas produces a population inversion which results in the emission of photons, and in the case of He-Ne, a visible light is generated which is indicative of the plasma. If the gas discharge cavity is properly positioned with respect to the plurality of mirrors, the excited gas will result in two counterpropagating laser beams traveling in opposite directions along an optical, closed-loop path defined by the mirrors.

In some embodiments of ring laser gyros, a unitary body provides the gas discharge cavity including the optical closed-loop path. Such a system is shown in U.S. Pat. No. 3,390,606 by Podgorski, which is assigned to the same assignee as the present invention. There an optical cavity is formed in a unitary block. A selected lasing gas is used to fill the optical cavity. Mirrors are positioned around the optical cavity at appropriate locations such that counterpropagating beams are reflected so as to travel in opposite directions along the optical cavity. A gas discharge is created in the gas filled optical cavity by means of an electrical current flowing in the gas between at least one anode and at least one cathode which are both in communication with the gas filled optical cavity.

It should be noted that prior art ring-laser gyro systems often have a pair of anodes and a single cathode which produce two electrical currents flowing in opposite directions. Each of the electrical discharge currents create plasma in the gas. Each current is established by an applied electrical potential, of sufficient magnitude, between one cathode and one anode. Alternately, the RLG may have two cathodes and one anode.

Various factors both external and internal to the RLG can effect beam intensity. Temperature is one external factor. A change in a cavity parameter is example of an internal factor. In the prior art, RLGs are commonly operated with essentially a constant power or constant current input which results in a variable beam intensity due to external or internal factors. A certain magnitude of operating current is selected which under a specified range of external and internal conditions produces a beam whose intensity is adequate for satisfactory operation. However, it has been determined that the useful life of the cathode is a function of the magnitude, over time, of the current it must carry; the greater the magnitude the shorter the useful life of the cathode. In addition, the useful operating life of internal elements of the RLG, such as mirrors, is a function of the magnitude of the operating current; the higher the current, the shorter the operating life. These internal and external factors have caused RLGs to be operated with a higher current than necessary during part of their operating life in order to produce a beam intensity satisfactory for operation under all conditions, thus shortening the potential operational life of the RLG.

SUMMARY OF THE INVENTION

It is therefore an object of the present invention to provide a current control system (cathode or anode control) which extends the useful life of the RLG elements, and thus the operating life of the RLG.

Briefly, this invention contemplates the provision of an RLG with a laser beam current control system which controls the current so as to produce a constant beam intensity, allowing the RLG to operate at a current level continuously matched to the operating conditions, thus extending the operating life of the RLG.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
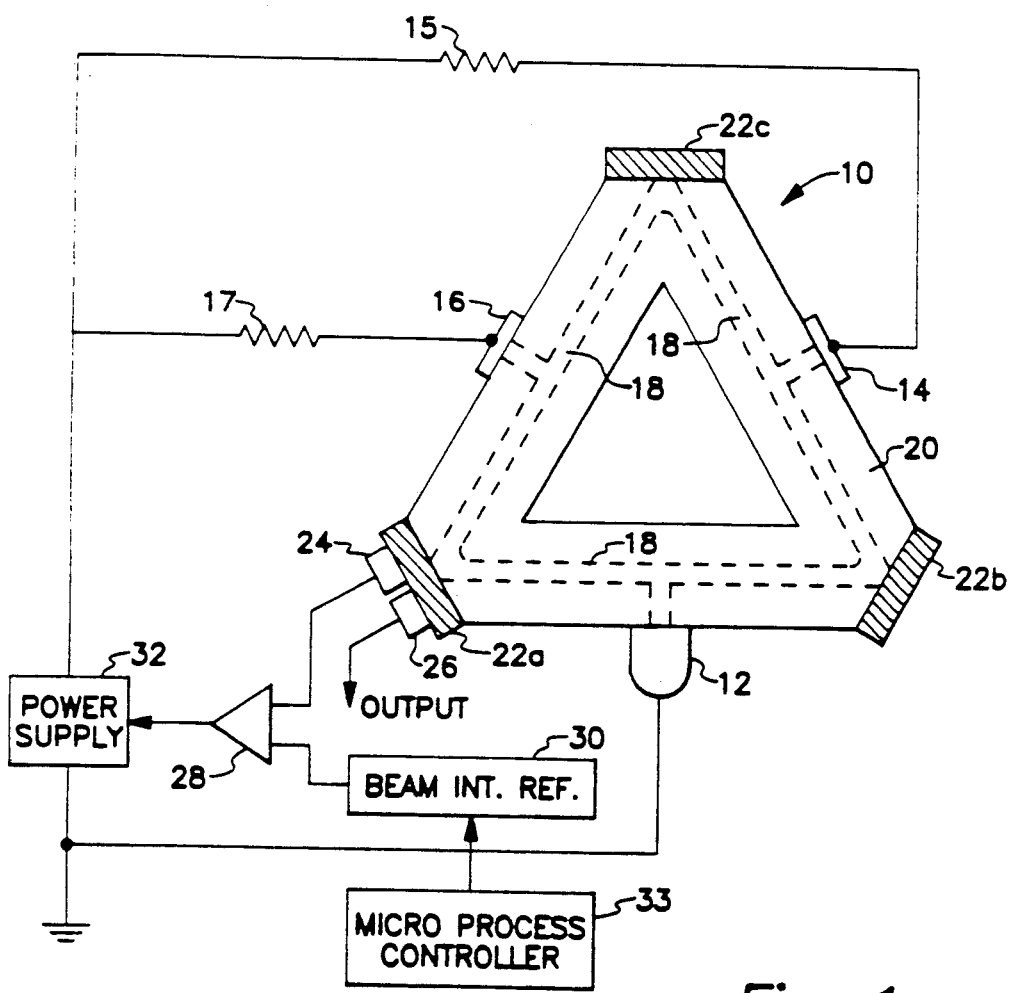
FIG. 1 is a schematic and block diagram drawing of an RLG and a current supply system in accordance with the teachings of this invention.

Referring now to FIG. 1, a solid block ring-laser gyro of the type in widespread commercial use today, designated by the general reference numeral 10, has a cathode 12 and two anodes 14 and 16. The RLG has three channels 18 formed in a solid, thermostable block 20 and three mirrors 22a, 22b and 22c at the intersections of the channels. The RLG in this specific embodiment of the invention is itself conventional and described in more detail in U.S. Pat. No. 3,390,606 to Podgorski. It should be noted that while the specific embodiment of the invention described herein employs one cathode and two anodes, the invention is equally applicable to RLG with a single anode and two cathodes or other anode cathode combinations, and with RLGs of various designs and configuration.

One of the three mirrors, 22a, is partially transmissive. A beam intensity sensor 24 and a rotational rate output sensor 26 are coupled to the mirror 22a. As is conventional and well known in the art, sensor 24 comprises a photodetector which is optically coupled to cavity so that it responds to a single beam and provides a d.c. output indicative of the intensity of the counter rotating laser beams. Sensor 26 comprises a photodetector which is optically coupled to the cavity so that it responds to the light and dark fringe patterns generated by the counter-rotating interfering laser beams and provides a.c. output whose frequency is a function of the rate of rotation of the RLG.

In accordance with the teachings of this invention, the output of the beam intensity sensor 24 is coupled as one input to a comparator 28 whose other input is coupled to d.c. reference 30 that is chosen to establish and maintain beam intensity satisfactory for RLG operation; preferably the minimum beam intensity consistant with reliable overall operation.

The output of the comparator 28 is coupled to a power supply 32 and the output of the power supply 32 is in turn coupled to the cathode 12 and the anodes 14 and 16 via ballast resistors 15 and 17. The current output of supply 32 is controlled by the error signal output of the comparator 28 so that if the beam intensity tends to increase or decrease, the output current respectively decreases or increases so as to maintain the beam intensity essentially constant. Thus the current input is maintained at all times at just the level needed to produce a beam intensity required for satisfactory operation. If desired, the beam current can be controlled so that its magnitude does not exceed a certain upper limit, or fall below a low limit. In addition, if desired, the beam intensity and/or the operating current limits may be varied by providing, for example, a microprocessor controller 33 to vary reference 30. For example, it may be advantageous to operate with an increased beam intensity or changed upper and lower limits after, for example, ten thousand hours of operating life. The microprocessor can be programmed to keep track of the operating hours and vary the reference potential to change the beam intensity after a predetermined period of operation.

Figure 2:
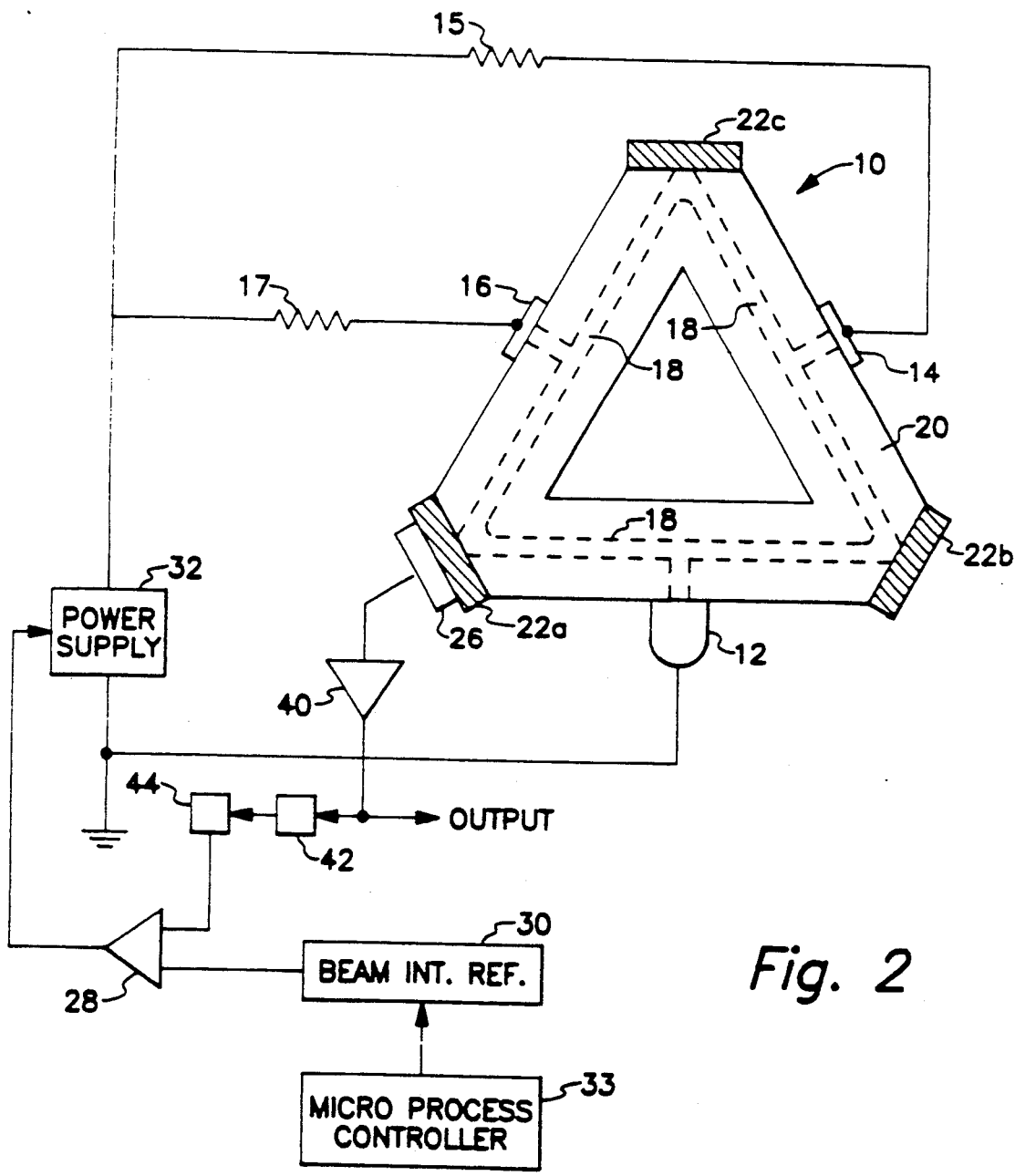
FIG. 2 is a schematic and block diagram drawing similar to FIG. 1 of an RLG and another embodiment of a current supply system in accordance with the teachings of this invention.

Referring now to FIG. 2, in another embodiment of the invention, the a.c. output signal from the sensor 26 is used to monitor beam intensity. This embodiment of the invention is advantageous where there is a variable d.c. bias in output of the beam intensity monitor as a result of the residual light generated in the cavities 14 by the gas discharge; this light is known in the art as "glow".

As will be appreciated by those skilled in the art, the sensor 26 typically comprises a photodetector which has a sinusoidally varying current output signal whose frequency is a function of angular rotation rate of the RLG and whose amplitude is a function of the beam intensity. In a dithered RLG there also will be a frequency component also due to dither.

Here the mirror, 22c, is partially transmissive. A rotational rate output sensor 26 comprises a photodetector which is optically coupled through the mirror 22c so that it produces a sinusoidal output signal in response to the light and dark fringe pattern generated by the counter-rotating interfering laser beams. The a.c. current output signal of sensor 26 is a.c. coupled to a rectifier and integrator to generate a d.c. signal whose magnitude is a function of the beam intensity. As is well known in the art, the frequency of the output signal of sensor 26 is a function of the rate of rotation of the RLG.

An amplifier 40, such as a Linear Technologies amplifier LT1012, preferably converts the sinusoidal current signal from the sensor 26 to a sinusoidal voltage signal. A band pass filter 42 filters the output of the amplifier 40 to remove noise from the signal, and couples the signal to the input of a rectifier 44 and integrator 46, whose d.c. output is proportional to the laser beam intensity. As will be appreciated by those skilled in the art, this d.c. signal may be utilized in the same way and for the same purposes as the output of a prior art beam intensity monitor optically coupled to a single beam. In addition, the output of the rectifier 44 may be coupled as one input to a comparator 28 whose other input is a reference 30 which is proportional to a desired beam intensity. The comparator output is coupled to a power supply 32. The output of the comparator controls current input to the RLG so that the beam intensity is maintained constant.

Figure 3:
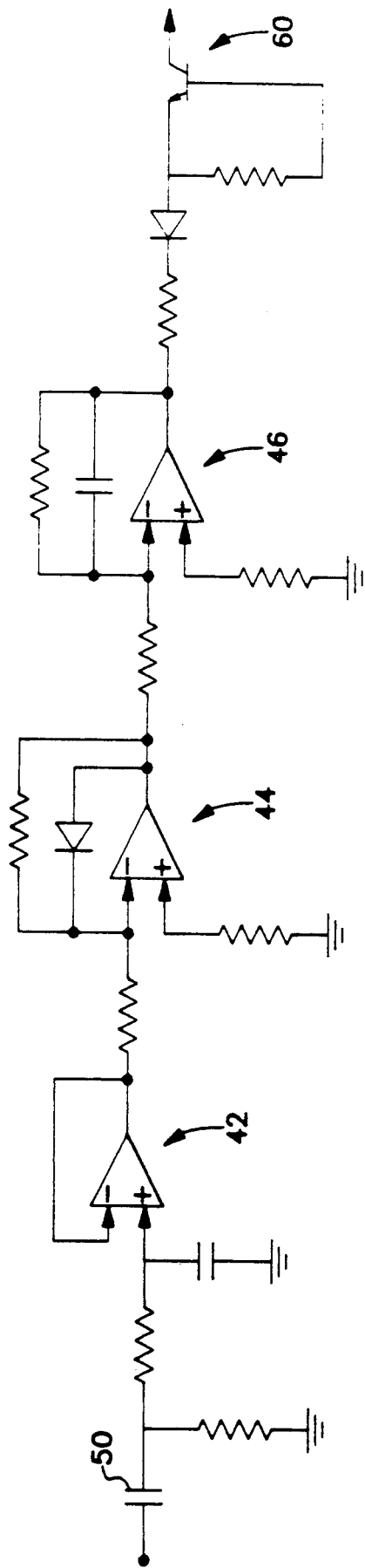
FIG. 3 is a somewhat more detailed schematic drawing of a portion of the supply system shown in FIG. 2.

FIG. 3 shows aspects of the system of FIG. 2 in more detail. A capacitor 50 couples the a.c. output of amplifier 40 to the input of a band pass filter 42 which filters out noise components in the a.c. signal. A half wave rectifier without offset 44 converts the a.c. signal to a variable d.c. signal which is integrated by a low pass filter 46. If desired, the d.c. output of the filter 46, whose d.c. voltage is a function of the beam intensity, can be converted to a current signal by amplifier 60.

While the invention has been described in terms of a single preferred embodiment, those skilled in the art will recognize that the invention can be practiced with modification within the spirit and scope of the appended claims.

Having thus described by invention, what I claim as new and desire to secure by Letters Patent is as follows:

1. In a ring laser angular rate sensor wherein a substantially thermally and mechanically stable block provides a plurality of interconnected cavities therein, selected ones of said plurality of interconnected cavities being interconnected to form a closed-loop path to permit light to travel along said closed-loop path, wherein said plurality of interconnected cavities contain an active gas which can freely communicate within said plurality of cavities, wherein a portion of an anode is in communication with said gas in one of said plurality of interconnected cavities, wherein a portion of a cathode is in communication with said gas in one of said plurality of cavities, said cathode and said anode each being electrically connected to at least a first electric potential of sufficient magnitude to establish an electric potential to maintain an electrical current, once established by ionization of said gas, between said anode and said cathode through said gas to cause two laser beams to travel in opposite directions through said selected ones of said cavities forming said closed-loop path, a combination comprising:

monitor means to generate a signal indicative of the intensity of said beams;

power supply means coupled to said anode and said cathode to supply said electric current; and means responsive to said monitor signal to control said electric current to maintain constant said intensity of said beams.

2. In a ring laser angular rate sensor wherein a substantially thermally and mechanically stable block provides a plurality of interconnected cavities therein, selected ones of said plurality of interconnected cavities being interconnected to form a closed-loop path to permit light to travel along said closed-loop path, wherein said plurality of interconnected cavities contain an active gas which can freely communicate within said plurality of cavities, wherein a portion of an anode is in communication with said gas in one of said plurality of interconnected cavities, wherein a portion of a cathode is in communication with said gas in one of said plurality of cavities, said cathode and said anode each being electrically connected to at least a first electric potential of sufficient magnitude to establish an electric potential to maintain an electrical current, once established by ionization of said gas, between said anode and said cathode through said gas to cause two laser beams to travel in opposite directions through said selected ones of said cavities forming said closed-loop path, a combination comprising:

monitor means to generate a signal indicative of the intensity of said beams;

power supply means coupled to said anode and said cathode to supply said electric current; and a source of reference signal for establishing a beam intensity;

means for comparing said monitor signal and said reference signal and generating an error signal whose magnitude is a function of the difference between said reference and said monitor signal; and means coupling said error signal to said power supply means to control said electric current to maintain constant said intensity.

3. In a ring-laser angular rate sensor as in claim 2 wherein said reference signal is chosen to provide a minimum beam intensity consistent with reliable operation.

4. In a ring-laser angular rate sensor as in claim 2 wherein said reference signal establishes a maximum and a minimum beam current.

5. In a ring-laser angular rate sensor as in claim 2 further including means for changing said reference signal.

6. In a ring-laser angular rate sensor as in claim 3 further including means for changing said reference signal.

7. In a ring-laser angular rate sensor as in claim 4 further including means for changing said reference signal to change said maximum and minimum limits.

8. In a ring-laser angular rate sensor as in claim 5 wherein said means for changing includes a controller which monitors the operation of said RLG.

9. In a ring-laser angular rate sensor as in claim 6 wherein said means for changing includes a controller which monitors the operation of said RLG.

10. In a ring-laser angular rate sensor as in claim 7 wherein said controller changes said reference after a predetermined period of operation.

11. In a ring-laser angular rate sensor as in claim 9 wherein said controller changes said reference after a predetermined period of operation.

12. In a ring-laser angular rate sensor as in claim 2 wherein said monitor means includes:

a photodetector for producing a sinusoidal output signal in response to a pattern of light and dark fringes generated by a pair of counter rotating, interfering laser beams;

means to rectify and integrate said sinusoidal signal to generate a d.c. signal whose magnitude is a function of said beam intensity.

* * * * *